Nov. 21, 1967     HUGH L. DRYDEN, DEPUTY     3,354,320
ADMINISTRATOR OF THE NATIONAL AERONAUTICS
AND SPACE ADMINISTRATION
LIGHT POSITION LOCATING SYSTEM
Filed Aug. 31, 1964

John M. McLauchlan
INVENTOR.

BY  G. T. McCoy
    Harvey B. Hertz
          ATTORNEYS

United States Patent Office 3,354,320
Patented Nov. 21, 1967

3,354,320
LIGHT POSITION LOCATING SYSTEM
Hugh L. Dryden, Deputy Administrator of the National Aeronautics and Space Administration, with respect to an invention of John M. McLauchlan, Pasadena, Calif.
Filed Aug. 31, 1964, Ser. No. 393,464
6 Claims. (Cl. 250—232)

ABSTRACT OF THE DISCLOSURE

Apparatus is provided for producing signals which represent information indicative of the location of a light source which is permitted to be imaged upon the photo detecting surface through a mask having a rectangular shaped opening over which a shutter is oscillated having a differently shaped opening, whereby the output of the photo detector comprises pulses whose width represents information as to the position of the light source.

---

This invention relates in general to light detection systems and, more particularly, to electro-optical apparatus for determining the position of a light source.

Because of the distances traversed in space flight, especially interplanetary space flight, it is necessary to direct the antennas on the spacecraft toward the earth in order to transmit and receive signals to and from the spacecraft which are weak upon arrival at their respective receiving means. Since it is desirable for the received signals to have as high a level as possible, the spacecraft antennas must be oriented in a position whereby the maximum signal can be transmitted and received. It has been found that by utilizing the earth as a light source and positioning the antennas so that they point directly toward this light source, it is possible to reduce requirements of the transmitter on the spacecraft. Normally, a light detector is mounted so that it points in the same direction as the antenna. The light detector determines the position of the light source with respect to the antenna and then a correctional signal is produced so that the antenna is positioned where a maximum signal can be transmitted and received.

It has been found, however, that in prolonged space flights, such as for a year or longer, where failure of moving parts in such light detectors can occur because of long continuous use, it is desirable that the moving parts of the light detector and associated equipment be kept to a minimum. Heretofore, light detection devices which have been used for positioning antenna spacecraft have required many moving parts and also been cumbersome and extremely complicated.

In order to overcome the attendant disadvantages in prior art light detection systems the light detection system of the present invention provides information with regard to the orientation of the spacecraft antenna with respect to the light source utilizing only a single moving part, thus allowing maximum reliability during prolonged space flights.

More specifically, according to an embodiment of the invention, an optical system focuses an image of a light source on the surface of a photosensitive light detector. Interposed between the optical system and the light detector is a position reference having a rectangular aperture therein. A trapezoidally shaped shutter is oscillated in a plane between the detector and the optical system, alternately blocking and passing the light image through the aperture of the position reference to the light detector. The light detector normally comprises a photomultiplier tube. As explained herein, output signals of the detector furnish information of the position of the light source with respect to two axes of an antenna and, further, provide information as to whether or not the light source is present. Correction of the antenna can then be made so that it points toward the light source.

The advantages of this invention, both as to its construction and mode of operation, will be readily appreciated as the same become better understood by reference to the following detailed description when considered in connection with the accompanying drawings in which like referenced numerals designate like parts throughout the figures and wherein.

Figure 1:
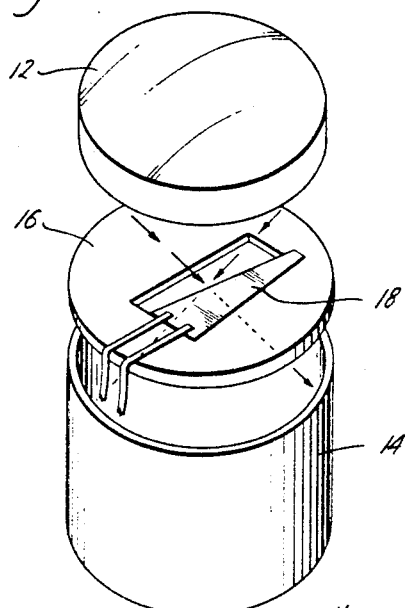
FIG. 1 is an exploded fragmentary view of the portions of the light detection system of the present invention.
Figure 2:
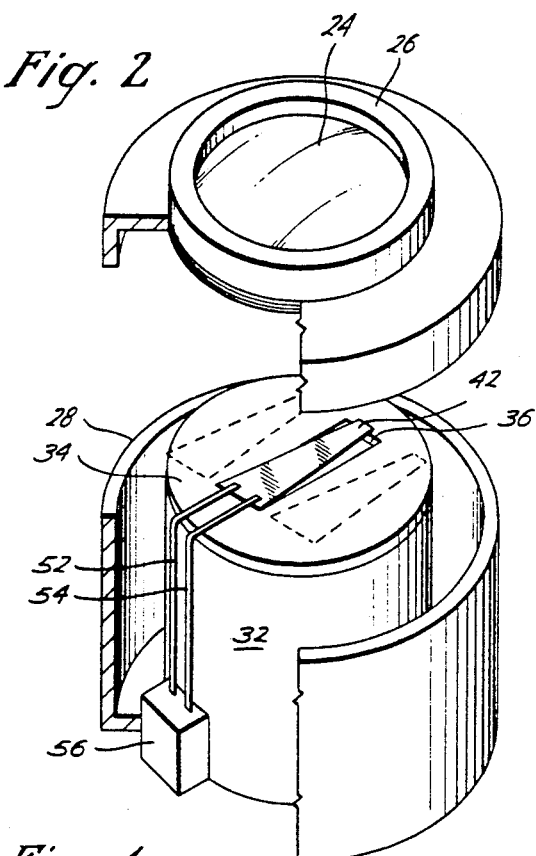
FIG. 2 is a perspective view of the light detection system of the present invention.
Figure 3:
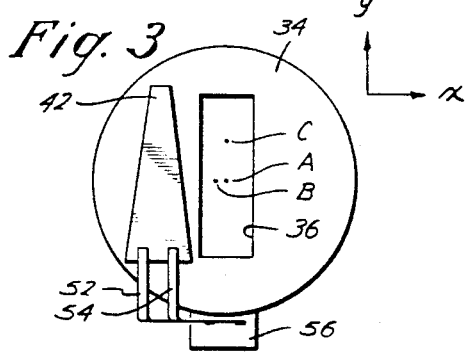
FIG. 3 is a view of a portion of the light detection system used to show various positions of the light source.
Figure 4:
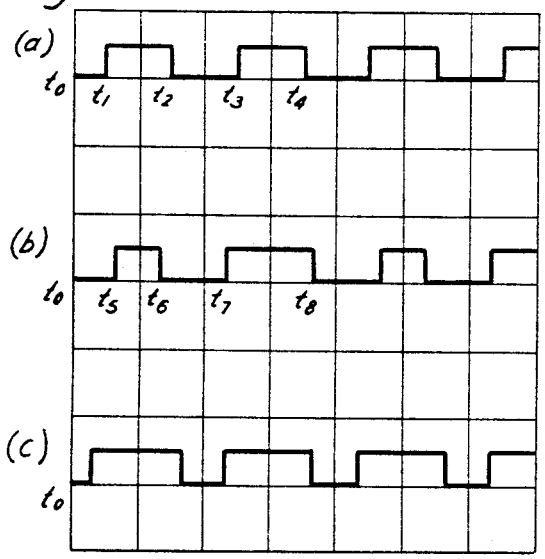
Figure 5:
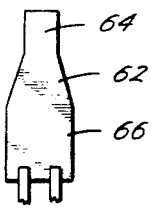

FIGS. 4(a), 4(b), and 4(c) show curves of the output voltages obtained from the light detection system and various positions of the light sources shown in FIG. 3, and FIG. 5 is an alternate embodiment of the shutter used in the light detection system of FIGS. 1–3.

Referring now to the drawings, there is shown in FIG. 1 the major portions of the novel light detection system of the subject invention for purposes of explanation of the operation thereof. The light detection system comprises essentially an optical system 12 which is used to focus an image of the source of light on a photosensitive light detector 14. Interposed between the optical system and the light detector is a position reference 16. Further, a shutter 18 having a trapezoidal shape is interposed between the optical system 12 and the position reference 16. The shutter oscillates back and forth across the position reference so that the light source whose rays are focused to a point in the plane of the position reference is alternately blocked and allowed to pass.

The light detection system of FIG. 1 is normally positioned with respect to an antenna on a spacecraft so that when the light source is focused in the center of the position reference 16 the antenna will be orientated in a position whereby a maximum signal will be both transmitted and received. Should the light source shift with respect to the antenna so that the light source is no longer focused in the center of the position reference, the antenna will no longer be in an optimum position. The amount of the shift of the light source from the center of the position reference is proportional to the amount which the antenna has shifted from its optimum position. The present invention provides a system for detecting and determining the amount of shift of the light source from the center of the position reference with respect to two axes in the plane of the position reference. A signal indicative of the position of the light source and the antenna can then be used to produce a correctional signal (which forms no part of this invention) for the antenna of a spacecraft. The antenna can then be moved to a position whereby maximum output signals will once again be transmitted and received. Simultaneously, of course, the light source will once again be positioned in the center of the position reference. Moreover, absence of a signal from the light detector would be an indication that no light source was present.

Referring now to FIG. 2, there is shown a preferred embodiment of the invention in accordance with the above illustrated drawing. The optical system comprises a lens 24 which is secured in a lens holder 26. The lens holder is fastened to one end of a housing 28. Also contained within the housing is a photosensitive light detector which comprises a photomultiplier tube 32 having a position reference which is formed of an opaque portion 34 mounted at the photosensitive end of the photomultiplier tube. A rectangular aperture 36 in the position reference allows light beams which impinge the lens 24 to pass through the position reference to the photosensitive surface of the photomultiplier tube.

The shutter comprises an opaque, trapezoidally-shaped member 42. The major width of the shutter is slightly greater than the width of the aperture 36. The shutter is caused to oscillate by means of a simple magnetic drive system (which forms no part of this invention). Secured to one end of the member 42 is a vibrating reed which is split into a pair of leaves 52, 54. The leaves are then secured to the magnetic drive means contained in a housing 56. Normally the drive means may consist simply of a pair of coils suspended in a permanent magnetic field.

The shutter oscillates in front of the aperture 36 to the extreme positions shown by the dotted lines in FIG. 2. These extreme positions are such that when the shutter is in these positions light from the lens 24 can strike any portion of the aperture 36 and will not be blocked by the shutter.

Referring now to FIG. 3, there is shown for purposes of illustration of operation of the device of FIG. 2 three different positions of the source of light focused in the aperture and in FIG. 4(a–c) the resultant output signals depicted by these three positions, respectively. In position A the light source is focused directly in the center of the aperture. When the light source is focused in this position and the shutter is positioned directly over the aperture, no light is received by the photomultiplier tube. FIG. 4(a) depicts the output voltage of the photomultiplier tube with the light source in position A. At time $t_0$, the shutter is positioned exactly at its center of movement. In this position the light source is blocked by the shutter and there is no output signal from the photomultiplier tube. As the shutter moves toward the left, at time $t_1$ the shutter will no longer cover the light source and an output voltage will be produced. This output voltage continues until time $t_2$ when the shutter has completed its movement to the left of the aperture and once again covers the light source as it moves to the right. At time $t_3$ when the shutter has moved to the right of the light source, an output voltage again is produced. The shutter continues its movement to the right of the aperture and then returns once again at time $t_4$ to a position where it is blocking the light source.

When the light source is focused at position B in the aperture, that is, moves along the x-axis with respect to the aperture, the shutter will block the light source but at a later time during the movement of the shutter from left to right in the drawing than if the light source were in the center of the aperture. FIG. 4(b) depicts the output voltage when the light source has been shifted to position B in FIG. 3. At time $t_0$ when the shutter is blocking the aperture, no output voltage is produced. However, as the shutter moves to the left an output voltage is produced at time $t_5$ when the light source is no longer blocked by the shutter which is at a time later than for a light source centrally positioned in the aperture. Further, as the shutter once again moves to the right the light source is covered at time $t_6$ and an output voltage is no longer produced. As the shutter continues to move toward the right the pulse once again is produced when the shutter uncovers the light at time $t_7$. Of course, as the shutter is moving toward the right and then once again toward the left, the output pulse width will be longer than the initial output pulse until a time $t_8$ at which time the output pulse is no longer produced due to the blocking of the light source by the shutter.

With the light source in position C, that is, the light source having moved along the y-axis with respect to the aperture, the narrow portion of the shutter will block the light source. Due to the narrow portion of the shutter blocking the light source, the output pulse width is wider than if the light source were in the center of the aperture. Referring now to FIG. 4(c), there is depicted the output voltages with the light source in position C in the aperture. The light source has moved to a position wherein the portion of the shutter covering the aperture will be smaller. At time $t_0$ when the shutter is centrally positioned with respect to the aperture, no output signal is produced. As the shutter oscillates in its normal pattern movement, due to the smaller time duration that the shutter will cover the light source larger output pulse widths are produced than for a centrally positioned light source while simultaneously smaller periods of no voltage output will be produced as the shutter covers the light source. Should the light source move along the y-axis in the opposite direction than that depicted by point C, the output voltage pulses would be smaller than that when the light source were centrally positioned in the aperture.

With the foregoing in mind it becomes readily apparent that by shaping the shutter trapezoidally the time that the shutter first blocks the light source during its movement is an indication of the position of the light source along an axis perpendicular to the slope of the edge of the shutter. Further, the duration of time that no output pulse is produced is an indication of the position of the light source along an axis parallel to the altitude of the trapezoid. Thus, by comparing both the time when an output signal no longer occurs and the time duration of no output signal with a reference signal, the position of the light source in the plane of the position reference can be ascertained by conventional circuitry. As previously explained the light detector may then be repositioned so that the light source is once again in the center of the position reference.

Referring now to FIG. 5, there is depicted an alternate embodiment of the shutter depicted in FIGS. 1 through 3. The shutter of FIG. 5 comprises a trapezoidal section 62 having attached thereto a pair of rectangular sections 64, 66. The widths of the trapezoidal section are equal to the width of the rectangular sections to which they are joined, respectively. Use of the shutter of FIG. 5 minimizes variations in output pulses. For example, with the use of the shutter of FIGS. 1–3 should the light source be positioned at the extremes of the aperture along the y-axis, either a large or small output pulse width, respectively, would be produced.

In the embodiment of FIG. 5, should the light source move along the y-axis a substantial amount, a correction signal will be produced until the light source has returned to the center. Should the light source move in the vicinity of either of the rectangular sections the output signal produced by the detector would, of course, be the same at any portion of each rectangular section. The correctional mechanism will then move the light detector so that the light source will once again be positioned toward the center of the aperture. However, since the purpose of the invention is to position the light source in the center of the aperture, it is unnecessary to exactly determine the position of the light source along the y-axis until the light source is positioned near the center of the aperture, that is, in the vicinity of the aperture covered by the trapezoidal section 62 of FIG. 5. By use of the rectangular sections connecting the trapezoidal section, if error signals dependent upon the pulse widths are used to correct the position of the vehicle, extremely large or extremely small output signals of the detector are not produced. Thus, the circuitry of the correctional device can be readily designed for a minimum of output pulse width variation.

An embodiment of the light detector utilizing the shutter depicted in FIG. 5 has been built utilizing a 7-element refraction system F/1.2, 50 mm. focal length lens for an optical system. The field of view was 4° along the x-axis and 10° along the y-axis. The shutter was driven at a frequency of 20 cycles per second. For a light detector, a Dumont type K2185 10-stage photomultiplier was utilized. This photomultiplier has an S–11 response, silver magnesium dynodes, and a current gain of $1.25 \times 10^5$ with 1250 volts excitation.

The detector was designed to detect celestial bodies that range in intensity from $1 \times 10^{-6}$ to $5 \times 10^{-11}$ watts per square centimeter and with a nominal color range of 6000° K.

While the light detection system has been described with regard to apparatus wherein the light detector is repositioned so that the light source remains in the center of the position reference, it should be understood, of course, that the light detector could remain fixed and output signals of the light detector used to determine the position of a moving light source.

While the aperture has been depicted as a rectangular opening, it should be understood, of course, that other configurations such as elliptical or circular openings could be used.

Further, while the shutter has been depicted both as a trapezoidal section and as a trapezoidal section interconnecting a pair of rectangular sections, other shapes such as a triangular section could be utilized.

It should be understood that the foregoing disclosure relates only to preferred embodiments of the invention and that it is intended to cover all changes and modifications of the examples in the invention herein chosen for the purposes of the disclosure which do not constitute departures from the spirit and scope of the invention.

What is claimed and desired to be secured by Letters Patent is:

1. A light detection system contained in a housing for determining the position of a light source about a first and second axes of a space vehicle comprising:
   a light detector mounted in said housing, said light detector comprising a photomultiplier tube having a photosensitive surface in a plane parallel to that of said first and second axes, said light detector having first and second output states, said first state being an output pulse when said light source is detected by a photosensitive surface and said second output state being a lack of an output signal when no light source is detected by said photosensitive surface;
   a position reference having a rectangular aperture therein mounted on said photosensitive surface in a plane parallel to that of said axes;
   an optical system having a lens forming the outer surface of a portion of said housing and mounted in a plane parallel to that of said axes for focusing an image of said light source on said photomultiplier tube; and
   means for alternately allowing said light source to be blocked and passed to said photosensitive surface through said aperture comprising a shutter having a trapezoidal shaped portion and first and second rectangular shaped portions, each of said portions being in a plane parallel to that of said axes, the width of said first and second rectangular portions being equal to the width of the parallel sides of said trapezoidal portion and being joined to the respective equal parallel sides, said shutter being interposed between said optical system and said light detector, drive system means for oscillating said shutter along an axis parallel to that of said parallel sides of said trapezoidal portion and parallel to the narrow sides of said rectanglar aperture, said drive system being mounted on said housing, said shutter being connected by means of said pair of leaves to a drive system mounted in said housing,
   the time change of said light detector from one output state to the other of said output states and the time duration of said output states being indicative of the position of the light source along said first and second axes, respectively, when compared with a reference signal.

2. A light detection system contained in a housing for determining the position of a light source about two axes of a space vehicle comprising:
   a light detector mounted in said housing, said light detector comprising a photomultiplier tube having a photosensitive surface, said light detector having first and second output states, said first state being an output pulse when said light source is detected by the photosensitive surface and said second output state being a lack of output signal when no light source is detected by said photosensitive surface;
   a position reference having a rectangular aperture therein mounted on said photosensitive surface in a plane parallel to that of said axes;
   an optical system having a lens forming the outer surface of a portion of said housing and mounted in a plane parallel to that of said axes for focusing an image of said light source on said photomultiplier tube; and
   means for alternately allowing said light source to be blocked and passed to said photosensitive surface through said aperture comprising a shutter having a trapezoidal shape in a plane parallel to that of said axes, said shutter being interposed between said optical system and said light detector, and means for oscillating said shutter along an axis of movement which is parallel to that of the parallel sides of said trapezoidal shutter and parallel to the narrow sides of said rectangular aperture;
   the time change of said light detector from one output state to the other of said output states and the time duration of the output states being indicative of the position of the light source along said first and second axes, respectively, when compared with a reference signal.

3. A light detection system contained in a housing for determining the position of a light source about a first and second axes of a space vehicle comprising:
   a light detector comprising a photomultiplier tube having a photosensitive surface, said light detector having two output states, the first state being an output pulse when said light source is detected by the photosensitive surface and the second output state being a lack of output signal when no light source is detected by said photosensitive surface;
   an optical system, a portion of which forms an outer surface of said housing for focusing an image of said light source on said photomultiplier tube; mask means having an opening for permitting said light source image to reach said photomultiplier tube only over a predetermined area; and
   means for alternately allowing said light source to be blocked and passed to said photosensitive surface comprising a shutter having a trapezoidal shape in a plane parallel to that of said axes, said shutter being interposed between said optical system and said light detector, means for oscillating said shutter along an axis of movement parallel to that of said parallel sides of said trapezoidal shutter and over a region which includes the area of said mask;
   the time change of said light detector from one output state to the other of said output states and the time duration of the output states being indicative of the position of the light source along said first and second axes, respectively, when compared with a reference signal.

4. A light detection system for determining the position of a light source about two axes of a space vehicle comprising:
   a light detector comprising a photomultiplier tube having a photosensitive surface, said light detector having two output states, the first state being an output pulse when said light source is detected by the photosensitive surface and the second output state being a lack of output signal when no light source is detected by said photosensitive surface;
   an optical system for focusing an image of said light source on said photomultiplier tube; mask means having an opening for permitting said light source image to reach said photomultiplier only over a predetermined area; and means for alternately allowing said light source to be blocked and passed to said photosensitive surface over time intervals determined by the location of said light source within the area of said mask means comprising a shutter interposed between said optical system and said light detector having a variable width in a plane parallel to that of said axes, and means for oscillating said shutter over the area of said mask means opening whereby the time change of said light detector from one output state to the other of said output states and the time duration during which the variable width shutter blocks or allows the light source to pass to said light detector is indicative of the position of the light source along said first and second axes, respectively, when compared with a reference signal.

5. A light detection system for determining the position of a light source about two axes of a space vehicle comprising:

a light detector having two output states, the first state being an output pulse when said light source is detected, and the second output state being a lack of an output signal when no light is detected;

an optical system for focusing an image of said light source on said light detector; and light detecting means for altering the time duration of said output pulses to be representative of the location of said light source including means for alternately allowing said light source to be blocked and passed to said light detector comprising a shutter having a variable width shape in a plane parallel to that of said axes, said shutter being interposed between said optical system and said light detector, a mask having a rectangular opening interposed between said optical system and said light detector, and means for oscillating said shutter across said opening whereby the time change of said light detector from one output state to the other of said output states and the time duration of said output states are indicative of the position of the light source along said first and second axes, respectively, when compared with a reference signal.

6. A light detection system for determining the position of a light source about a first and second axes of a space vehicle comprising:

a light detector comprising a photomultiplier tube having a photosensitive surface, said light detector having two output states, the first state being an output pulse when said light source is detected by the photosensitive surface and the second output state being a lack of output signal when no light source is detected by said photosensitive surface;

an optical system for focusing an image of said light source on said photomultiplier tube; and means for blocking and passing said light source to said photosensitive surface for varying durations dependent upon the position of the light source along said first axis comprising a shutter having a variable width in a plane parallel to that of said first and second axes a mask with an opening therethrough having a constant width, and means for oscillating said shutter across the opening of said mask.

References Cited

UNITED STATES PATENTS

| | | | |
|---|---|---|---|
| 2,654,027 | 9/1953 | Baum | 250—237 X |
| 2,713,134 | 7/1955 | Eckweiler | 250—203 X |
| 2,877,356 | 3/1959 | Iddings | 250—233 X |
| 2,906,883 | 9/1959 | Hansen | 250—203 |
| 2,966,823 | 1/1961 | Trimble | 250—203 |
| 2,997,699 | 8/1961 | Lovell. | |
| 3,099,749 | 7/1963 | Williams | 250—237 X |
| 3,124,691 | 3/1964 | Brouwer | 250—232 X |
| 3,192,824 | 7/1965 | Rosenthal. | |

ARCHIE R. BORCHELT, *Primary Examiner.*

RALPH G. NILSON, *Examiner.*

J. D. WALL, *Assistant Examiner.*